United States Patent [19]
Haka

[11] Patent Number: 5,931,271
[45] Date of Patent: Aug. 3, 1999

[54] HYBRID DRIVE WITH ONE-WAY DRIVE CONNECTIONS

[75] Inventor: Raymond James Haka, Brighton, Mich.

[73] Assignee: General Motors Corporation, Detroit, Mich.

[21] Appl. No.: 08/997,625

[22] Filed: Sep. 19, 1997

[51] Int. Cl.⁶ ........................................................ B60K 6/02
[52] U.S. Cl. ........................ 192/48.92; 180/65.2; 290/4 C
[58] Field of Search .................................. 180/65.2, 65.3; 290/4 C, 45; 192/48.92

[56] References Cited

U.S. PATENT DOCUMENTS

| | | | |
|---|---|---|---|
| 5,258,651 | 11/1993 | Sherman | 180/65.2 X |
| 5,433,282 | 7/1995 | Moroto et al. | 180/65.2 |
| 5,558,175 | 9/1996 | Sherman | 180/65.2 |
| 5,773,904 | 6/1998 | Schiebold et al. | 180/65.2 X |
| 5,789,823 | 8/1998 | Sherman | 180/65.2 X |

*Primary Examiner*—Richard M. Lorence
*Attorney, Agent, or Firm*—Donald F. Scherer; Michael J. Bridges

[57] ABSTRACT

A hybrid drive has an internal combustion engine and a motor/generator (M/G) for supplying and absorbing driving forces either alone or in combination. Two one-way devices are assembled between the engine and the M/G. One of these one-way devices permits the M/G to drive the engine at start-up and is released centrifugally at or above engine idle speed. The other one-way device permits the M/G to overrun the engine if the engine is at idle speed during dynamic braking. This permits all the dynamic braking energy of the M/G to be used in a regenerative fashion when battery charging is necessary.

2 Claims, 2 Drawing Sheets

5,931,271

HYBRID DRIVE WITH ONE-WAY DRIVE CONNECTIONS

TECHNICAL FIELD

This invention relates to hybrid drive mechanisms.

BACKGROUND OF THE INVENTION

Hybrid transmissions have at least two power sources which generally include an internal combustion engine and a motor/generator (M/G). The M/G is used to start the engine. To accomplish this, a friction device is included to establish a power path between the engine and the M/G.

During certain operating conditions, for example, regenerative braking, it is desired that this path be disconnected such that the engine will not absorb any of the regenerative energy.

SUMMARY OF THE INVENTION

It is an object of the present invention to provide an improved hybrid drive having one-way connections between an engine and a motor/generator.

In one aspect of the invention, a centrifugally responsive one-way clutch is positioned between the M/G and an internal combustion engine to provide a drive connection for starting the engine by the M/G. The one-way clutch disengages the drive connection at or above engine idle speed.

In another aspect of the invention, a second one-way device is disposed between engine and the M/G to permit the M/G to overrun the engine during dynamic or regenerative braking.

DESCRIPTION OF AN EXEMPLARY EMBODIMENT

Figure 1:
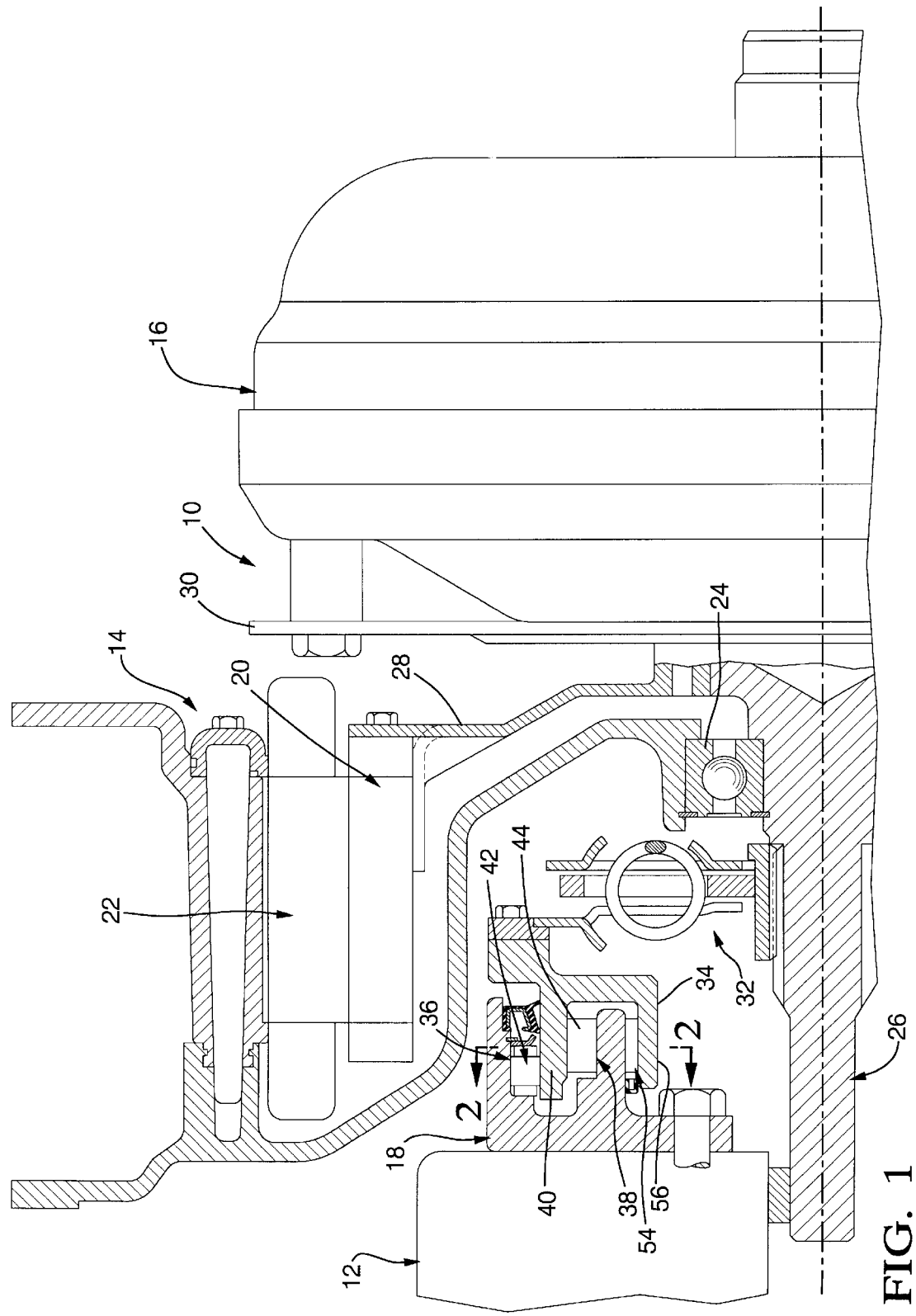
FIG. 1 is a side elevational view, partially in section, of a hybrid drive system.

Referring to the drawings, wherein like characters represent the same or corresponding parts throughout the several views, there is seen in FIG. 1 a hybrid drive mechanism, generally designated 10, including an internal combustion engine 12, a motor/generator 14 and a torque converter and clutch 16. The engine 12 is a conventional internal combustion engine and has an engine drive hub 18 which is drivingly connected with the engine crankshaft.

The motor/generator 14 is a conventional electric power device which is capable of both supplying output power from a battery source and for generating power to either recharge the battery or drive other electrical mechanisms. The torque converter and clutch 16 is a conventional hydrodynamic and friction clutch assembly. As is well known, these hydrodynamic devices utilize a clutch to bypass the fluid drive for a more efficient drive mechanism during high speed or road load applications.

The motor/generator 14 has a rotor portion 20 and a stator portion 22. The rotor portion 22 is supported on a ball bearing 24 which, in turn, is rotatable with an input shaft 26. The rotor 20 has a hub 28 which is secured to the input shaft 26 and also to a flex plate 30 which is a component of the torque converter and clutch 16. The input shaft 26 has splined thereto a conventional spring damper assembly 32. The outer periphery of the spring damper 32 has secured therewith an M/G drive hub 34.

The engine drive hub 18 has an outer race portion 36 and an inner race portion 38. The M/G drive hub 34 has an inner/outer race portion 40. A roller type one-way clutch 42 is disposed between the outer race 36 and the inner/outer race 40. A sprag type one-way clutch 44 is disposed between the inner/outer race 40 and the inner race 38.

Figure 2:
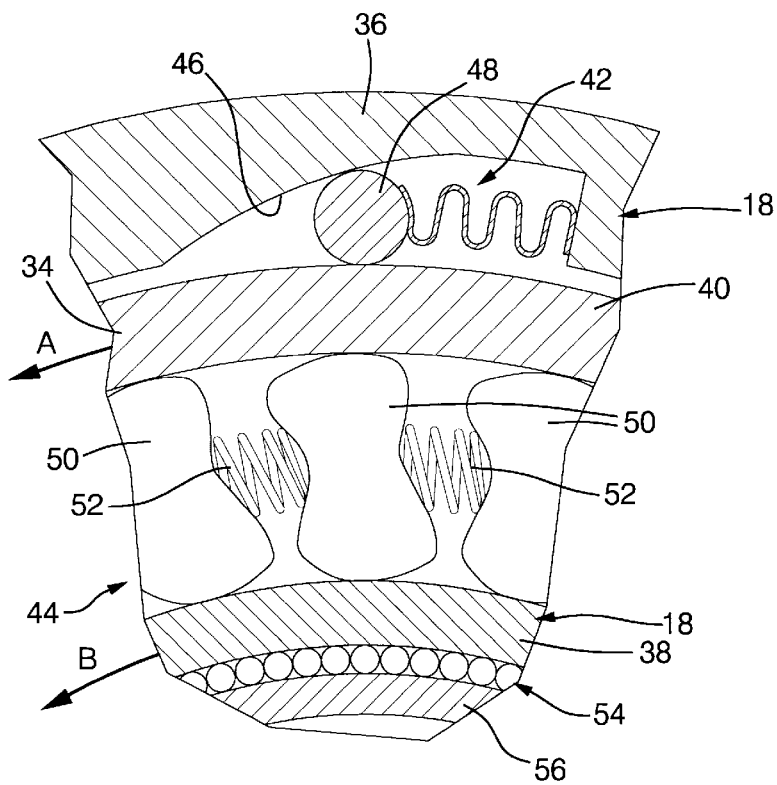
FIG. 2 is a view taken along line 2—2 of FIG. 1.
Figure 3:
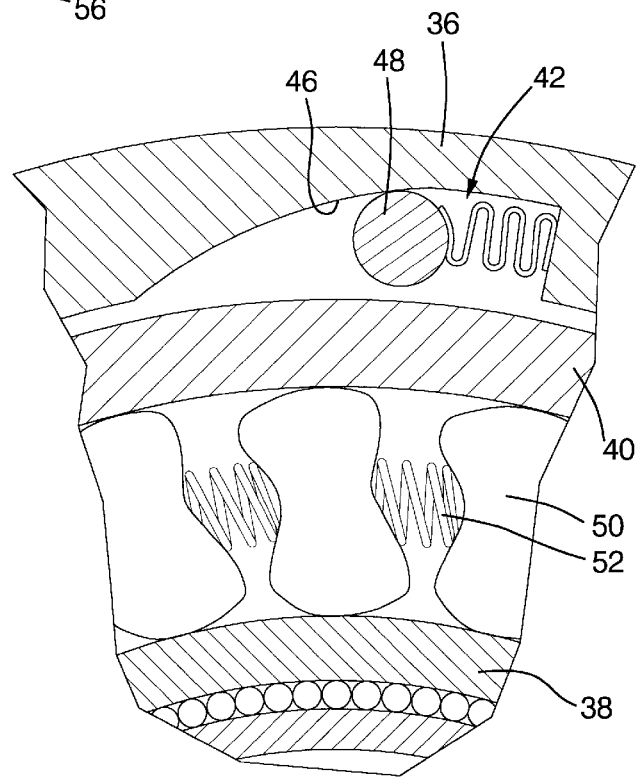
FIG. 3 is a view similar to FIG. 2 showing a second operating position for one of the one-way clutches.

As best seen in FIGS. 2 and 3, the outer race 36 has formed therein a plurality of cam surfaces, one of which is shown at 46. A roller 48 is disposed between the inner/outer race 40 and each respective cam surface 46 to provide a releasable one-way drive connection.

A plurality of sprags 50 are disposed between the inner/outer race 40 and the inner race 38. These sprags are separated by springs 52 to provide for locating the sprags properly within the space between the races 40 and 38. The sprags 50 will provide a one-way drive connection between the inner race 38 and the race 40. A roller bearing 54 is disposed between the inner race 38 and an annular extension 56 formed on the M/G drive hub 34. This provides some rotational support for the M/G drive hub relative to the engine drive hub 18.

During engine start-up, the M/G 14 is rotated in the direction of Arrow A. To provide this rotation, a battery, not shown, is utilized to energize the M/G 14. With the inner/outer race 40 being rotated in the direction of Arrow A, the rollers 48 are urged into engagement with respective cam surfaces 46 thereby forcing the outer race 36 and engine crankshaft to rotate in the direction of Arrow A which is the normal operating direction for the engine. This rotation accompanied by a conventional starting or ignition mechanism for the engine 12 will cause the engine to operate on its own power.

When the engine reaches an idle speed, generally 600 rpm, the outer race 36 will begin to rotate faster than the inner/outer race 40 such that centrifugal forces on the rollers 48 will urge them to the position shown in FIG. 3 where the rollers are out of engagement with the inner race 40. Thus, there is no drive connection through the one-way clutch 42 whenever the engine is operating at or above idle speed or when it is rotating more rapidly than the inner/outer race 40.

However, it is desirable at times to supply power from the engine to the motor/generator 20 and torque converter 16. This is accomplished by the inner race 38 being rotated in the direction of Arrow B which causes the sprags 50 to be cammed between the race 38 and the race 40, such that the motor/generator will be urged to rotate in the same direction as Arrow B. When this occurs, the motor/generator 14 is driven by the engine and supplies electrical power for various operations within the vehicle in which the hybrid drive 10 is utilized.

When the operator wishes to decelerate or brake the vehicle, the engine 12 is permitted to return to the idle speed while the motor/generator 14 is driven at vehicle speed. In this instance, the one-way clutch 42 will remain centrifugally disengaged and one-way clutch 44 is in the direction to permit the race 40 to overrun the race 38. The motor/generator is driven by the vehicle and will supply electrical power. The electrical power, during vehicle brake or dynamic braking, can be utilized to both operate other electrical members of the vehicle and to recharge the vehicle batteries, such that pure electric drives can be had on occasion and engine starting power will be available when necessary.

The operator does not have to exercise any control over these devices in order for them to operate in their desired manner, and on braking merely has to permit the engine to drop below drive speed for the dynamic braking to occur without the engine absorbing any energy of the dynamic braking.

I claim:

1. A hybrid drive having an engine with an output shaft and a motor/generator with an input/output shaft comprising:

a first one-way torque transmitting mechanism disposed, when said engine shaft speed is less than an idle speed and said motor/generator is operating as a power source, between said engine shaft and said motor/generator shaft to provide for torque transmission, said first one-way torque transmitting mechanism being responsive to said engine shaft speed above said idle speed to discontinue torque transmission; and a second one-way torque transmitting mechanism disposed between said engine shaft and said motor/generator shaft to permit said motor/generator shaft to overrun said engine shaft when said motor/generator shaft speed is greater than said engine shaft speed and for transmitting torque from said engine shaft to said motor/generator shaft when said engine shaft speed is greater than said motor/generator shaft speed.

2. The hybrid drive defined in claim 1, wherein said first and second one-way torque transmitting mechanisms share a race member which provides an inner race for the first one-way torque transmitting mechanism and an outer race for the second one-way torque transmitting mechanism.

* * * * *